United States Patent [19]
Guillen et al.

[11] Patent Number: 5,522,071
[45] Date of Patent: May 28, 1996

[54] RUN-TIME MESSAGE REDIRECTION FOR INVOKING OBJECT ORIENTED METHODS BASED ON ALTERNATE DISPATCH VARIABLE

[75] Inventors: Juan Guillen, Russell; James M. Leask, Canata, both of Canada

[73] Assignee: Sybase, Inc., Emeryville, Calif.

[21] Appl. No.: 449,583

[22] Filed: May 24, 1995

Related U.S. Application Data

[63] Continuation of Ser. No. 183,478, Jan. 18, 1994, abandoned.
[51] Int. Cl.⁶ ........................................ G06F 9/44
[52] U.S. Cl. ................ 395/650; 395/200.03; 395/200.15
[58] Field of Search ................ 395/200.03, 200.15, 395/650

[56] References Cited

U.S. PATENT DOCUMENTS

| | | | |
|---|---|---|---|
| 5,187,786 | 2/1993 | Densmore et al. | 395/600 |
| 5,265,206 | 11/1993 | Shackelford et al. | 395/200 |
| 5,280,610 | 1/1994 | Travis, Jr. et al. | 395/600 |
| 5,283,898 | 2/1994 | Kusumoto et al. | 395/650 |
| 5,313,633 | 5/1994 | Tomita et al. | 395/700 |
| 5,315,703 | 5/1994 | Matheny et al. | 395/164 |
| 5,361,350 | 11/1994 | Conner et al. | 395/600 |
| 5,369,778 | 11/1994 | San Soucie et al. | 395/800 |

Primary Examiner—Ken S. Kim
Attorney, Agent, or Firm—John A. Smart

[57] ABSTRACT

Method and system for dispatching a message to an alternate object upon its failure to find a required method at the object to which originally sent. The method and system employ the technique of using alternate dispatch variables which can be provided with values naming the alternate objects to which the messages are to be dispatched upon failure of execution at the local object. The alternate object toward which the message is dispatched may contain a method required for execution by a message sent to a first object, but which is unfulfilled by absence of the desired method in the first object. The class of the first object establishes alternate dispatch variables which can be set at run-time by a user making entries in a graphical user interface (GUI) effective to cause redispatch of the message to the alternate object.

11 Claims, 2 Drawing Sheets

RUN-TIME MESSAGE REDIRECTION FOR INVOKING OBJECT ORIENTED METHODS BASED ON ALTERNATE DISPATCH VARIABLE

This is a continuation of application Ser. No. 08/183,478 filed Jan. 18, 1994, now abandoned.

Cross Reference To Related Applications

This application is related to patent applications each of them filed on Jan. 18, 1994 and having the same inventorship as herein, and respectively entitled "Object Oriented Dispatch and Supercall Process and Arrangement," "Compilation and Virtual Machine Arrangement and Process for Source Code Including Pre-Runtime Executable Language Constructs," and "Variable Resolution Method and Arrangement." These patent applications have respective Ser. Nos. 08/183,480, 08/184,497 and 08/184,492, now abandoned. These patent applications are assigned to the same assignee as herein, and are incorporated herein by reference in their entirety.

BACKGROUND OF THE INVENTION

This invention relates generally to object oriented processes and arrangements, and specifically to alternate dispatch variable approaches in object oriented processes and arrangements to enable performance of selected methods in object oriented systems.

Object oriented processes and arrangements have employed particular message dispatch approaches to deal with the implementation and execution of selected methods called by messages transmitted to particular objects in the course of operation of an object oriented system. The execution of methods associated with particular objects is commonly initiated by sending a message invoking the method to an object which is associated with the particular method sought to be executed. If in fact the method is resident in the object to which the message invoking the method is sent or is associated therewith, then execution is not problematic. However, if a message is sent to an object having no association with the method sought to be executed, then a search of dispatch tables is typically conducted at the class level to find the method so that the particular message can be redispatched appropriately.

The search for the method to be invoked can for example be directed hierarchically up the object chain to a higher level. For example, class level dispatch tables containing particular methods have been associated with object classes and object superclasses. Accordingly, the method sought by a particular message may be found up-line in a class or superclass of a particular object to which the message has been sent.

Additionally, when a new class is created from a superclass, the new class is known to inherit the data, the methods, the attributes, the property, the instances and the dispatch tables of the superclass. However, the characteristics and methods of other, independent classes are not directly available to new objects created under a first selected class, despite the effectiveness of inheritance mechanisms that apply specifically to the class under which the particular object was created.

In accordance with the invention, it is an object to provide an approach for dispatching messages to alternate class objects for implementing methods asserted in the dispatched messages.

Additionally, it is an object of the invention to promote efficiency and flexibility in the creation of object relationships and their processing.

SUMMARY OF THE INVENTION

In particular, according to the invention herein, a message sent to a class level object is effectively dispatchable to an alternate object by a declarative statement associated with the object to which the message is initially sent. This declarative statement approach to alternate object messaging is order independent, which means that no process is invoked in order to accomplish alternate dispatch. This declarative statement in the variable space of an object is effective for accomplishing redirection of the message to the alternate object for method location and execution. The alternate dispatch is conducted at the class level with respect to an object class. The alternate dispatch is independent of dispatch tables which may be associated with an object class.

Alternate variable dispatching mechanisms can be pre-established to permit run-time implementation of linkages to other, non-class objects. According to a version of the invention, the alternate dispatch mechanism can be established at the class definition level, by defining object variables for respective classes of the object system, and labeling the particular object variables as dispatch variables. Then, at run-time, the user can specify in the property description of a selected object that the value of the particular dispatch variable is the name of another object at which the user expects the method desirably invoked by a message to the first object will be found.

According to the invention, the dispatching class level object has a predefined variable space which may include a plurality of variables of the object type, called alternate dispatch variables.

Additionally, great flexibility in the selection of methods to be implemented by object instances under user direction is achieved by the chaining and interrelationships afforded between dispatch tables at all levels, the instance level, the class, and the superclass. Thus, if a particular method is not currently present in a given object instance, a search routine is capable of implementation by following the preestablished associations between dispatch tables at the instance level and through the class hierarchical structures that have been established.

In summary, the invention provides a method and arrangement for referencing an alternate object which may contain a method required for execution by a message sent to a first object, but unfulfilled by absence of the desired method in the first object.

According to the invention herein, a process is provided according to which if a message is sent to an object in an object system comprising objects and classes, a search of the immediate object to which the message was sent will initially be conducted to determine the presence or absence of the required method to accomplish the purposes of the message. If the required method is not found to be associated with the particular object to which the message has been directed, then processing continues with a search for methods associated with the class of the particular object to which the message has been sent. In each case, if the required method is found, execution of the method is undertaken immediately upon successful conclusion of the search. However, if neither the search of methods directly associated with the message target object nor that associated with the class of objects to which the message has been sent, then the process of the invention continues with reference to the subprocess of alternate variable dispatching.

According to the invention, the subprocess of a alternate dispatch variable processing, a search is conducted as to the particular object to which the message was sent, to sequence all alternate dispatch variables which have been associated with the particular object. A check is made whether a value has been assigned to a particular alternate dispatch variable which has been sequenced. If a value has been assigned to a particular alternate dispatch variable, then the message sent to the initial object is transmitted to the object referenced by the alternate dispatch variable for which a value (in terms of the name of the referenced object) has been determined. If the message is understood by the referenced object, then the method is executed in accordance with the message sent, and operation is completed as to the particular message. However, if the referenced object does not understand the message sent, then the remaining alternate dispatch variables are searched for a determination of whether these other alternate dispatch variables may contain values referencing other objects to be tested for fulfillment of the method requirements of the message sent. As before, if success is attained, the relevant method is performed and operations as to the message are considered to be completed.

These and other features and advantages of the present invention will become apparent upon reading the following detailed descriptions and studying the various figures of the drawings.

DETAILED DESCRIPTION OF THE PREFERRED EMBODIMENTS

Figure 1:
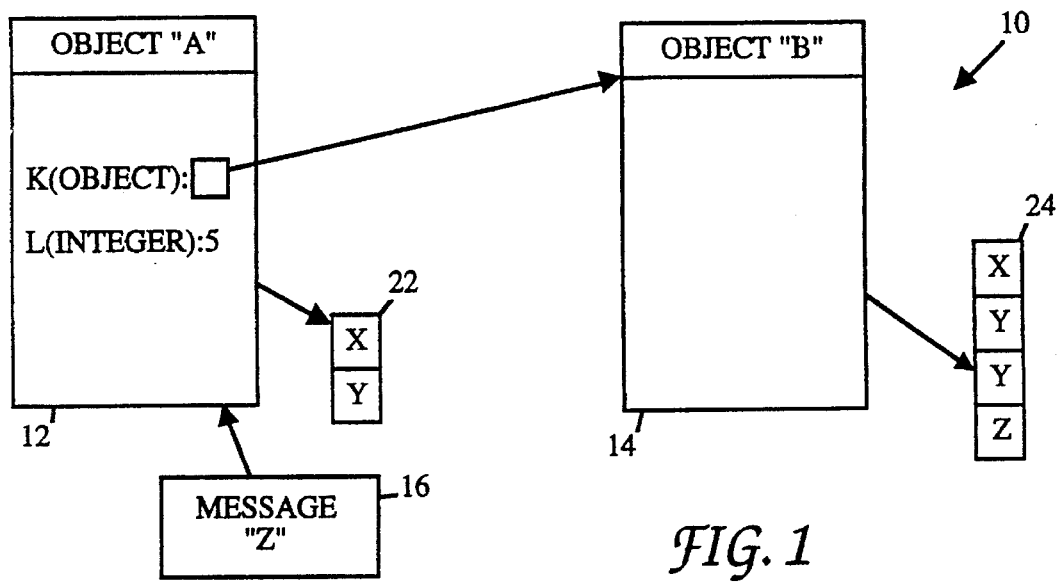
FIG. 1 shows the architecture and relationships between two objects of different classes which are subject to alternate dispatching techniques according to the invention herein.

FIG. 1 shows an object system 10 according to the invention herein, including the architecture and relationships between two objects, respectively 12 and 14, of different classes which are subject to alternate dispatching techniques according to the invention herein. The indicated objects 12 and 14 are alternatively referred to herein as respective objects A and B. One of the objects is the target of a message invoking a particular method which is not available at the target class. The other of the objects has the needed method required by the message embedded in its system.

In particular, object 12 (i.e., object A) is shown in receipt of a message Z, i.e., message 16. Respective objects 12 and 14 reference associated dispatch tables 22 and 24 containing respectively methods X and Y, and methods X, Y, Y, and Z. Object A is characterized by an object variable K and an instance variable L. The value of the object variable K at the time of object characterization is unspecified, hence K is defined as "K (object): ." On the other hand, the value of the instance variable L is specified to indicate that it is an integer and equal in value to five (5). "K(object)" simply indicates that the variable K is an object variable. The blank space after "K(object)" is the location at which the name of a particular alternate object is to be indicated for message redispatching.

According to the invention herein, object A employs an alternate dispatch variable "K(object):" to refer to another object, in this case object B, to enable message Z to carry out method Z, even thought object A does not contain method Z. The use of a dispatch variable, permits the user to specify a link to the appropriate object containing method Z during run-time, by making an appropriate graphical user interface (GUI) entry, as will be discussed in greater detail below.

Figure 2:
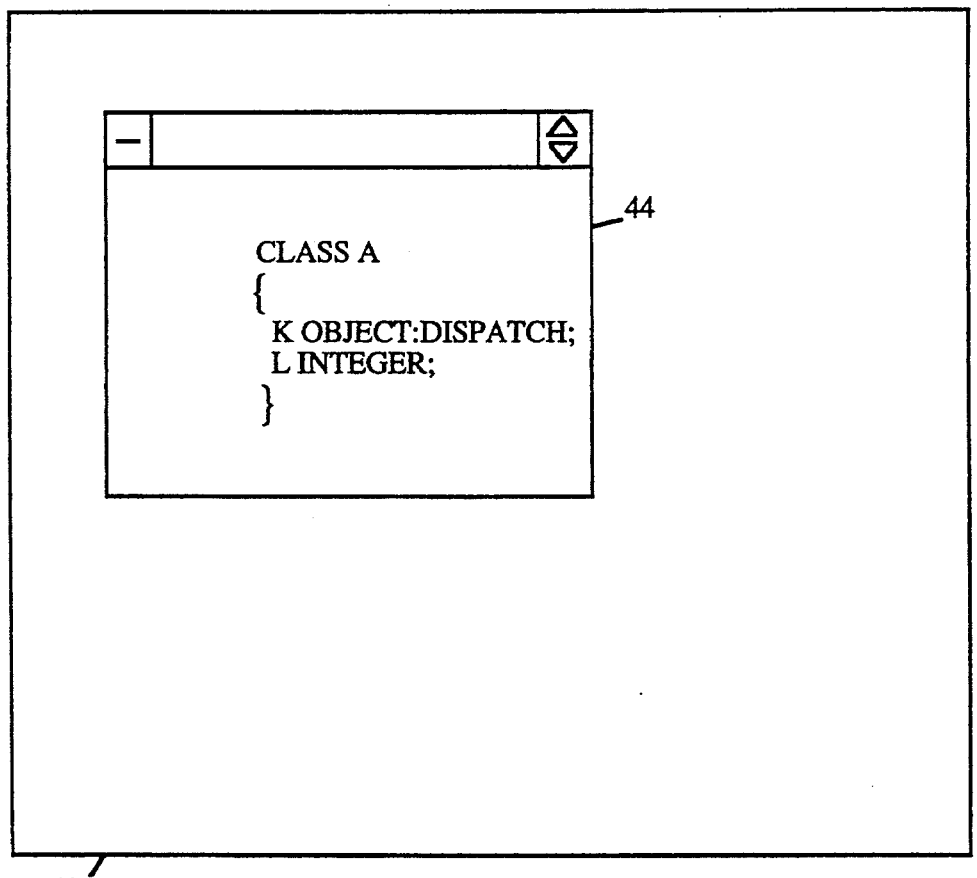
FIG. 2 illustrates a graphical user display (GUI) monitor containing a window and an object definition which includes specification of variables in variable space.

FIG. 2 illustrates a graphical user display (GUI) monitor containing monitor 40 and a window 44, and an object definition which includes specification of selected variables in a variable space. In particular, window 44 shows the characterization process for an object, in this case object A. Object A is characterized as follows:

| Class A |
|---|
| { |
|     K  object: dispatch; |
|     L  integer; |
| } |

In the actual case, a plurality of particular dispatch variables can be specified in the class definition. Accordingly, in this fashion, pervasive reliance upon redirecting messages to other objects can be undertaken based upon the relatively simple mechanism of alternate dispatch variable specification and value definition. This process and the software arrangements according to this process are effective for avoiding loss of valuable memory space and processing time arising out of having multiple copies of the same method dispersed over large numbers of objects.

Figure 3:
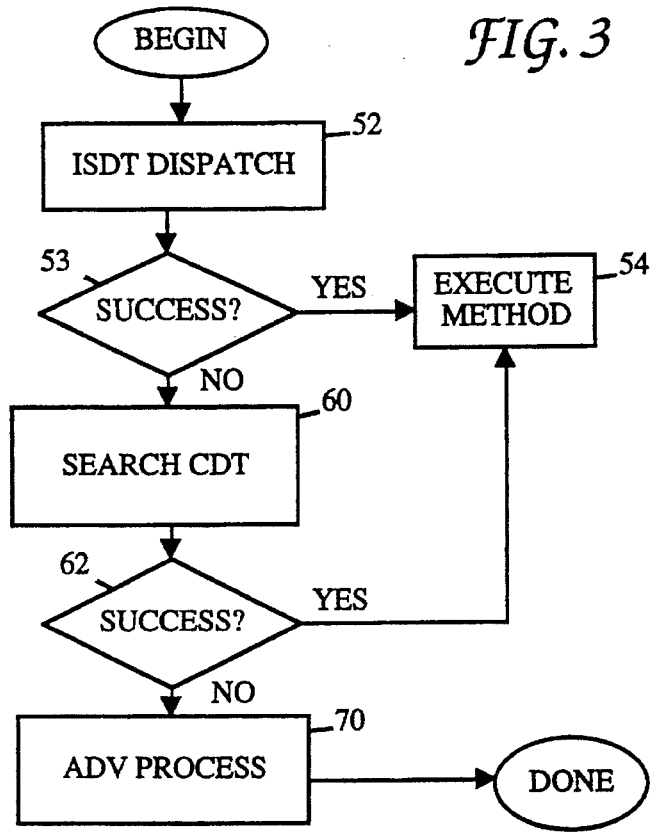
FIG. 3 is a flow chart of an object oriented dispatching method which includes steps according to the invention herein.

FIG. 3 is a flow chart 50 of an object oriented method dispatching process which includes steps according to the invention herein. Typically, message dispatching is conducted initially through instance specific dispatch tables (ISDT), according to block 52. If this is not successful, and needed variables have not been sufficiently defined, to permit execution of a desired method, then message dispatch through a class dispatch table (CDT) is undertaken, as suggested at block 60. The class dispatch table approach includes the following steps. First the CDT is searched from bottom up to find a method to be executed in response to a particular message (block 60). If the desired method is found, it is executed (block 54). Finally, if the desired method is not found (block 70), processing continues according to the invention herein with message dispatching according to FIG. 4.

Figure 4:
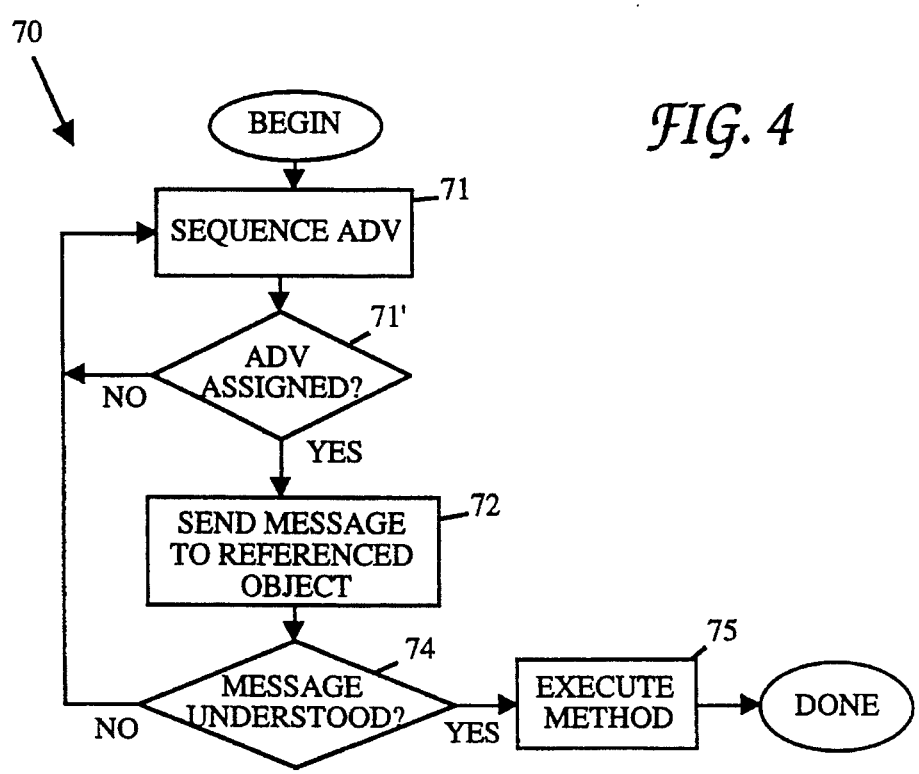
FIG. 4 is a flow chart of the alternate dispatch variable process according to the invention herein.

In particular, FIG. 4 is a flow chart of the alternate dispatch variable process 70 according to the invention herein. As shown in FIG. 4, the alternate dispatch variable process according to the invention begins with the sequencing of all alternate dispatch variables contained in the object 12 to which the particular message 16 has been sent, as per block 71. To begin, a first alternate dispatch variable (ADV) is recognized during processing. A check is undertaken to determine whether the particular alternate dispatch variable has an assigned value, according to block 71". The value assigned is the name of an object to which the unexecutable message is to be dispatched for method processing. If no assigned value is present, then processing continues with the next alternate dispatch variable as per box 71.

If an assigned value exists, the variable directs further processing to the referenced object, i.e., object "B", as per block 72 in FIG. 4. Next, a check is conducted to determine whether the message sent to the alternate object has been understood. This is indicated at decision box 74. If the message is understood, then the method associated with the particular method is executed, as called for by box 75. However, if the message is not understood, then processing continues with the next alternate dispatch variable according to box 71.

The alternate dispatch variable approach begins, according to block 70 with evaluation of a particular ADV. If the particular variable has not been assigned, processing continues with the next alternate dispatch variable. If a specific ADV is assigned, the message is sent to the referenced object, as per block 72. Finally, if the referenced object does not understand the message sent, as per block 74, then processing skips to the next in order ADV.

While this invention has been described in terms of several preferred embodiments, it is contemplated that many alterations, permutations, and equivalents will be apparent to those skilled in the art. It is therefore intended that the following appended claims be interpreted as including all such alterations, permutations, and equivalents as fall within the true spirit and scope of the present invention.

What is claimed is:

1. In a system for creating and using an object-oriented program created from object-oriented source listings in a computer, the source listings comprising at least two object-oriented classes, each object-oriented class having data and methods, and the program operating in response to messages received by objects created from said object-oriented classes, a process for invoking a given method of a first object when a message seeking to invoke the given method is received by a second object, said first object being created from a first object-oriented class and said second object being created from a second object-oriented class, the process comprising:

displaying representations of said first and second objects on a graphical user interface;

receiving, during runtime execution of said program, user input for establishing a connection from said second object to first second object, so that messages for invoking methods of said first object can be received initially by said second object and then dispatched to said first object;

in response to receiving said user input, storing in an alternate dispatch variable of said second object information describing the connection;

upon receipt by said second object of a message calling a particular method, determining whether the particular method called is a method of said second object;

if the particular method called is determined to be a method of said second object, executing the method at said second object;

if the particular method called is determined not to be a method of the second object, dispatching said message from said second object to said first object, based on said information stored by said alternate dispatch variable of said second object which describes the connection from said second object to said first object; and if the particular method called is determined to be a method of said first object, executing the method at said first object.

2. The process according to claim 1, wherein said particular method is not associated with said first object-oriented class.

3. The process according to claim 1, wherein said particular method is associated with said first object-oriented class, so that said particular method is executed at said first object.

4. The process according to claim 1, further comprising sequencing alternate dispatch variables contained in an object to which a message has been sent.

5. The process according to claim 1, further comprising recognizing the presence of at least a single alternate dispatch variable associated with an object in receipt of a message.

6. The process according to claim 1, further comprising checking whether a particular alternate dispatch variable has an assigned value.

7. The process according to claim 6, wherein if a particular alternate dispatch variable is found without an assigned value, processing continues with a search for a next alternate dispatch variable.

8. The process according to claim 6, wherein an alternate dispatch variable is found with an assigned value and the alternate dispatch variable is effective in directing the message and its processing to an alternate object referenced by the value assigned to the alternate dispatch variable.

9. The process according to claim 8, wherein a check is conducted to determine whether the message sent to the alternate object has been understood.

10. The process according to claim 9, wherein the method associated with the particular message which has been directed to an alternate object is executed.

11. The process according to claim 9, wherein processing continues with a next alternate dispatch variable, if the message is not understood.

* * * * *